INVENTORS
Richard G. Grundman, &
Cecil H. Sharpe
Paul Fitzpatrick
ATTORNEY

INVENTORS
Richard G. Grundman, &
Cecil H. Sharpe

Paul Fitzpatrick
ATTORNEY

United States Patent Office 3,477,647
Patented Nov. 11, 1969

3,477,647
FUEL SPRAY NOZZLE
Richard G. Grundman, Grand Rapids, Mich., and Cecil H. Sharpe, Brownsburg, Ind., assignors to General Motors Corporation, Detroit, Mich., a corporation of Delaware
Filed Feb. 20, 1967, Ser. No. 617,142
Int. Cl. B05b 1/34; F23d 11/14
U.S. Cl. 239—468
8 Claims

ABSTRACT OF THE DISCLOSURE

A fuel spray nozzle of the swirl type for use with fuels bearing abrasive particles resists erosion of the swirl chamber by introducing the fuel at a radius much less than the radius of the swirl chamber and not much greater than the radius of the outlet. Also, the outer wall of the swirl chamber is a replaceable ring which may be of very hard metal.

---

The invention herein described was made in the course of work under a contract or subcontract thereunder with the Department of Defense.

Our invention relates, so far as the preferred use is concerned, to fuel spray nozzles such as are employed in gas turbines. In a more general aspect, the invention relates to fluid spray devices of the swirl type having relatively great resistance to abrasion by the fluid and also embodying structure in which the part most subject to wear is readily replaceable and may be particularly hard.

Fuel spray nozzles of the swirl type have long been known. The general principle of operation of such spray devices is that fluid is introduced generally tangentially into a chamber within which it swirls and from which it escapes by flowing over the lip of an opening at one end of the chamber concentric with the chamber.

It is also known to provide a swirl nozzle with two swirl chambers, one for small fuel flows disposed within a larger chamber for high flow rates, each chamber having its own outlet with the outlet from the large flow chamber disposed around that from the small flow chamber. Such a device is shown, for example, in Grundman et al. Ser. No. 2,954,172.

Fuel nozzles of this type are relatively trouble-free as long as they are supplied with very clean fuel, as is usual. However, it is not always possible to provide extremely well filtered fuel, and for this reason we have been engaged in the development of a swirl type spray nozzle having substantial useful life even though the fuel is contaminated by abrasive particles such as sand or the like. Since the atomizing effect of a swirl nozzle depends upon the introduction of the fuel at high pressure to create a high velocity movement of the fuel in the swirl chamber, it is obvious the operation of the fuel nozzle is well adapted to cause excessive abrasion of the walls of the swirl chamber. It has been found that the abrasion occurs more rapidly, in the type of swirl nozzle described herein, on the outer or peripheral wall and is slower on the forward and rearward walls and on the ports through which the fuel enters and leaves the swirl chamber.

According to our invention, the abrasion is greatly reduced by enlarging the radius of the swirl chamber relative to the radius to the swirl ports so that there is a substantial volume of fluid within the swirl chamber radially outward of the swirl ports, thus largely protecting the outer wall from the incoming jet of contaminated fuel. This will be enlarged upon in the subsequent description. Further, to minimize wear and to provide for quick repair of worn swirl chambers, we have devised a structure in which the outer wall of the swirl chamber is a separate readily removable ring which, further, may be made of a particularly wear-resistant material. The preferred embodiment of our invention as illustrated herein also includes means to trap large particles of sediment which can be otherwise expected to block the swirl ports to the large flow or secondary ports. However, this device is not the subject of the present application, being described fully and claimed in our copending application Ser. No. 617,164 for Fuel Nozzle Contaminant Trap, filed Feb. 20, 1967.

The nature of our invention and the advantages thereof will be clear to those skilled in the art from the succeeding detailed description of the preferred embodiment of the invention and the accompanying drawings in which.

Figures 1, 2:
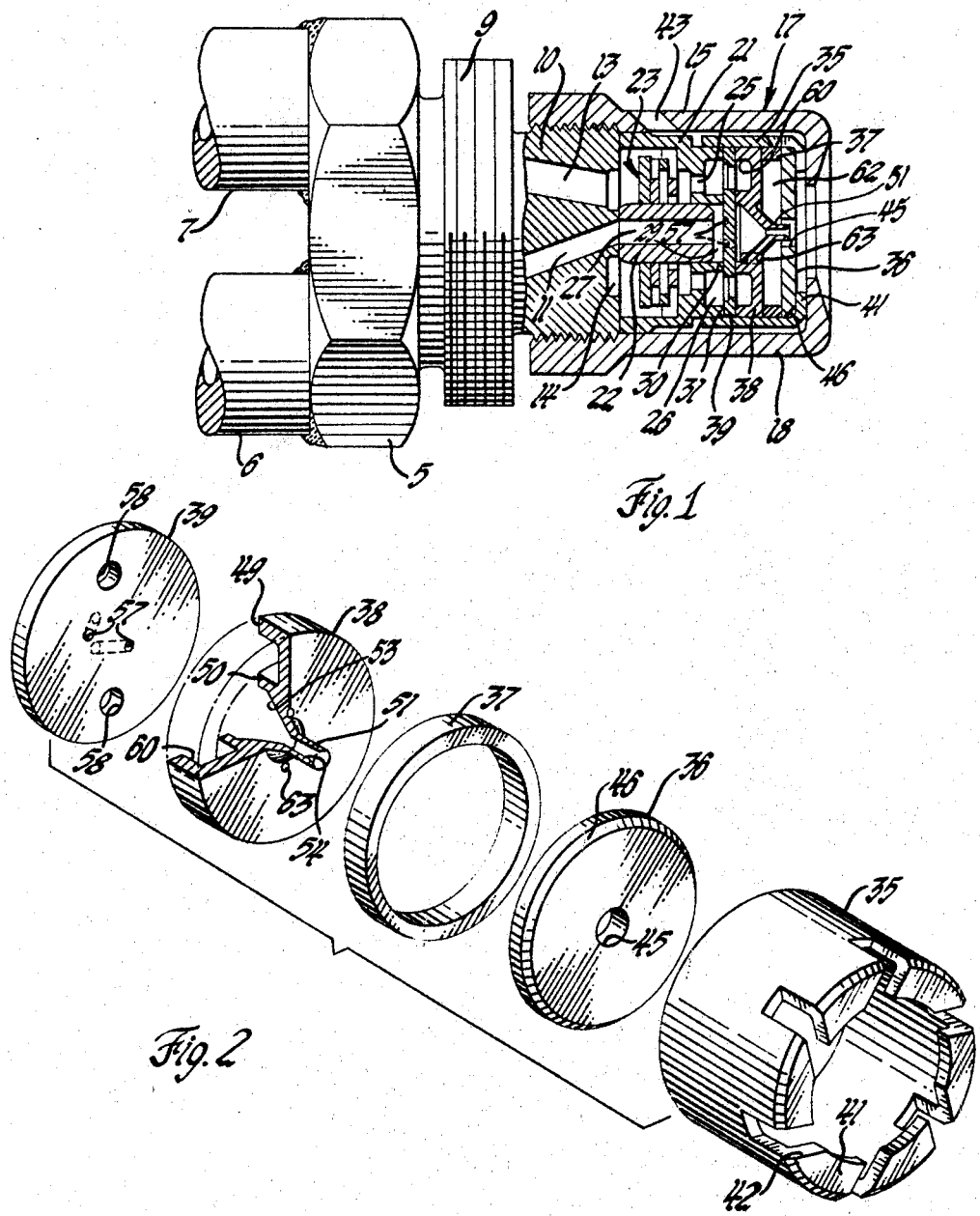
FIGURE 1 is a longitudinal sectional view of a fuel nozzle.
FIGURE 2 is an exploded axonometric view of the fuel spraying portion of the nozzle.

Referring generally to the environment of our invention, the fuel spray nozzle comprises a body 5 having a first inlet conduit 6 for the primary (small flow) fuel and a second inlet 7 for the secondary or large flow fuel. The body includes a threaded portion 9 by which it may be secured in place in a combustion chamber and terminates in an externally threaded boss 10. Primary inlet 6 connects to a passage 11 terminating at the center of the boss and the secondary inlet communicates with a passage 13 terminating in an annular recess 14 in the face of boss 10.

The principal operative parts of the nozzle comprise the contaminant trap indicated generally by 15 and the fuel spray assembly indicated generally at 17. These are held in place on the body by an air shroud and retainer 18 which threads onto boss 10. The retainer bears against the spray assembly which in turn bears against the contaminant trap, which abuts the face of boss 10. The type of contaminant trap 15 (hereinafter called simply a trap) shown comprises a generally cup-shaped annular casing 21, a hollow stem 22, and a number of rings and plates indicated generally at 23 which define tortuous paths for the secondary fuel between the casing and the stem from the inlet at 14 to a number of outlets 25 through the downstream end wall of the casing. The downstream wall defines an annular space 26 which acts as the inlet for secondary fuel to the spray tip 17. The stem 22 defines a passage 27 into chamber 29 for primary fuel from which it flows into the spray tip. The annular flange 30 of the casing separates the primary fuel chamber 29 from the annular secondary fuel chamber 26 which in turn is bounded by a flange 31 on the casing. The trap will not be further described in this application, since the details are not material to the invention to which this application is directed and are fully described in our above-mentioned copending application.

Proceeding now to the structure of the fuel spray assembly 17 in which our present invention is embodied, this comprises a housing 35, an orifice plate 36, a ring 37, a spray tip 38, and a director plate 39. The housing is of generally cylindrical configuration with an inwardly directed flange 41 into which are cut a number of circumferentially inclined slots 42. It slides onto casing 21. The elements 36, 37, 38, and 39 are stacked in abutting relation within the interior of air shroud 35, and the director plate 39 bears against the flanges 30 and 31 of the trap casing 21. The retainer 18 pressing against the end of housing 35 holds the operative parts of the spray assembly together. This retainer also provides an inlet 43 for air which flows between the retainer and the parts 21 and 35 and inwardly through slots 42 to sweep the face of orifice plate 36. The orifice plate 36 is a simple disk which has an interior cylindrical bore 45 defining an outlet for the fuel and has a chamfered outer edge 46. The ring 37 is a simple ring of rectangular cross section. Spray tip 38 is of somewhat more involved shape, being a disk having outer and inner rearwardly directed flanges 49 and 50 and a central boss 51 projecting from the downstream side of the disk. A generally conical swirl chamber 53 for primary fuel is defined within the flange 50, this swirl chamber continuing into a primary fuel orifice or outlet 54 extending through the boss 51, the tip of which lies within the orifice 45 of plate 36. Director plate 39 is a disk having two swirl ports 57 for primary fuel which are supplied from chamber 29 and discharge into the swirl chamber 53. Director plate 39 also is bored to provide two secondary fuel passages 58 which connect the chamber 26 within the trap casing to the secondary fuel annulus 60 within the spray tip 38.

Figure 3:
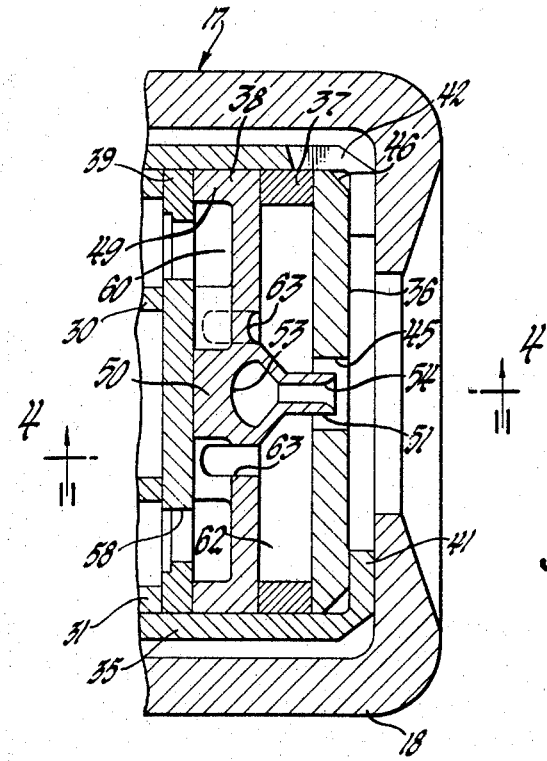
FIGURE 3 is a longitudinal sectional view of a portion of the spray tip taken on the planes indicated by the line 3—3 in FIGURE 4.
Figure 4:
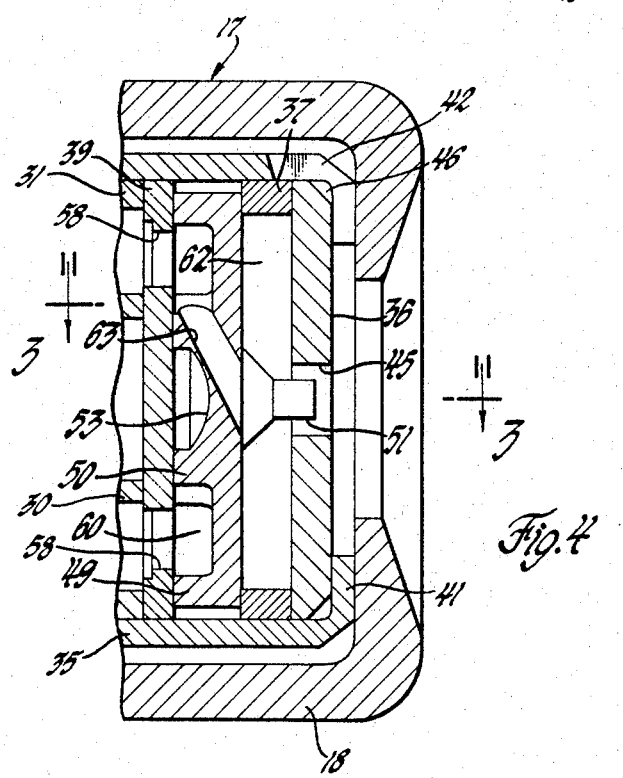
FIGURE 4 is a longitudinal sectional view of the same portion of the spray tip taken on the planes indicated by the line 4—4 in FIGURE 3.

When the nozzle is assembled, orifice plate 36 defines the rear wall, ring 37 defines the outer wall, and spray tip 38 defines the front wall of a secondary fuel swirl chamber 62 (FIGURES 1, 3, and 4). The fuel is introduced to this chamber through two secondary fuel swirl ports 63 in spray tip 38 which are inclined, as usual, at about 30° to a plane perpendicular to the axis of the nozzle, as shown in FIGURE 4, which is a section taken along the center line of one of the swirl ports. The center lines of the secondary swirl ports at the point of entry to chamber 62 are tangential to a cylinder which is of considerably smaller radius than the interior radius of ring 37 and not of much greater radius than the secondary outlet orifice 45. Put another way, as compared to conventional swirl nozzles, our abrasion resistant nozzle embodies a swirl chamber 62 of large radius relative to the size of the outlet orifice and to the radial displacement of the swirl ports from the nozzle axis, thus providing a large body of fuel radially outward of the normal flow path spiralling inward from the swirl ports to the lip of the outlet 45. As will be appreciated, the direct flow through the swirl port approaches the axis of the nozzle through a certain part of its flow; but, once the jet passes the perpendicular to the nozzle axis, the line of flow then diverges from the axis and, if there were nothing in its way, the entering fuel ultimately would reach the outer wall of the swirl chamber. If the flow is introduced adjacent the outer wall, the high velocity jet bearing the abrasive particles extensively scours and abrades tre wall of the swirl chamber where the entering jet hits the wall much as a stream erodes its outer bank at a bend in the stream. The result of such local abrasion is to spoil the circular cross section of the swirl chamber. With our structure, the jet from the swirl port enters within a relatively large body of swirling fuel which is moving in essentially circular paths in what is believed to be a forced vortex. As fuel is added, of course a corresponding part of the fuel spirals inward from the swirl ports 63 in what should normally be substantially free vortex flow and spills in a thin film over the lip of orifice 45. The centrifugal force effects are quite prominent because of the high rotational velocity resulting from supply of fuel at pressure drops of the order of 400 p.s.i. through the swirl ports.

Even with the structure illustrated, there is some wear in this swirl chamber, principally of the outer wall defined by ring 37, but also of the rear wall defined by orifice plate 36. There is, of course, some wear of the forward wall. This wear taking place near the periphery of the chamber is believed to be largely due to circulation of abrasive particles by the swirling fuel. In the structure of our nozzle, parts most subject to wear may be very easily replaced by unscrewing the retainer 18, taking apart the spray tip assembly, and replacing parts 36 and 37. While to meet most requirements we have found that a hard stainless steel A.M.S. 5632 about 56° Rockwell is quite satisfactory and has surprisingly long life once it is protected by the fluid buffer due to the large swirl chamber radius, it is possible to use even more resistant material if desired. Thus, tungsten carbide has been successfully tried for the orifice plate 36 and ring 37 which can readily be machined from such a hard material. However, the configuration of the swirl chamber is more important than the hardness of the metal in reducing abrasion.

Nozzles embodying the principles of our invention have shown a very gerat increase in endurance with contaminated fuel over nozzles previously used, which improvement is attributable to the arrangement of the swirl chamber, the proportions of which are quite significantly different from prior nozzles of which we are aware. In the particular embodiment illustrated in this application, as an example, it can be noted that the swirl chamber is 0.375 inch in diameter and the swirl ports 0.034 inch in diameter with their center lines tangent to a cylinder of 0.130 inch diameter. The outlet orifice from the swirl chamber is 0.078 inch in diameter in this case. Thus, in this case the offset of the center line of the swirl ports is approximately 35 percent of the radius of the swirl chamber and the radius of the outlet is approximately 21 percent of the radius of the swirl chamber. The axial length of the swirl chamber determined by the ring 37 is 0.050 inch. This nozzle has been satisfactorily tested for endurance with highly contaminated fuel.

These particular dimensions were determined to a considerable extent by the installation; that is, the swirl chamber was made as large as feasible within the limitations of size of the particular fuel nozzle. In most applications of gas turbine fuel nozzles, compactness of the nozzle is highly desirable. Thus, the 0.375 inch diameter of the swirl chamber was based primarily upon the size of housing 35 of the prior nozzle which was the subject of the program to improve resistance to contaminated fuel.

Some experiments have been made with reducing the dimensions of the swirl chamber. By using relatively soft metal, a wear test using contaminated fuel can be performed in a few hours. Comparative use tests have demonstrated that as the diameter of the swirl chamber is reduced by increasing the radial thickness of ring 37, maintaining the location of the swirl ports 63 and the diameter of outlet 45 the same, the wear of the swirl chamber progressively increases. This, of course, suggests that the swirl chamber should be as large as the installation permits, although it seems reasonable that benefits of further enlarging the chamber must be slight once its radius becomes as large as 3 or 4 times the radius to the swirl ports.

Experiments also involved variation of the length of the swirl chamber axially of the nozzle as determined by the width of ring 37. In this connection, it developed that reducing the length from 0.050 inch to 0.040 inch had no clear effect upon performance or abrasion of the nozzle. However, further reduction to 0.030 inch resulted in quite substantial wear of the forward wall of the chamber in the direction of the jets from the swirl ports. It has been hypothesized that this resulted from a cavitation effect.

Since, as above stated, the abrasion of the walls of the swirl chamber increased with decreases in radius of the chamber, if other factors remained constant, it appears that the swirl chamber radius should be something like three times the radius to the center of the swirl ports for best results. However, since the increase in wear was gradual with the decrease in radius of the swirl chamber, it is apparent that beneficial results do not require such a large ratio and that any substantial spacing of the swirl ports radially inward from the outer wall of the swirl chamber will be beneficial. Thus, the swirl chamber should have a radius substantially greater than the radius to the swirl ports to provide a cushion of fuel between the incoming jet and the outer wall of the chamber. Preferably, the proportions should be as specified above. Also, in the general configuration of nozzle described herein, the axial length of the swirl chamber should be sufficient to prevent cavitation wear of the forward wall. Such a sufficiency can be determined by tests as outlined above.

The terms "abrade" and "abrasion" as used in this specification and the following claims refer to wearing, grinding, or rubbing away by friction as distinguished from eating away of material by chemical action.

The description of the preferred embodiment of the invention for the purpose of explaining the principles thereof is not to be considered as limiting or restricting the invention, since many modifications may be made by the exercise of skill in the art.

We claim:

1. A spray nozzle particularly adapted for use with liquids bearing abrasive materials comprising, in combination, a body defining a swirl chamber in the form of a figure of revolution about an axis, the said body comprising a first part defining a front end wall of the chamber, a second part defining the outer wall of the chamber, a third part defining a rear end wall of the chamber and defining a fluid outlet coaxial with said chamber through the rear end wall thereof, one said part defining a said end wall further defining fluid inlet port means through the said end wall disposed generally tangentially to said axis so as to cause fluid supplied to said chamber through said port means to swirl around said axis against said outer wall and between said front and rear end walls and to flow through said outlet, the said parts being physically distinct and readily separable and being held in abutting stacked relation to define the chamber, and readily detachable means compressively retaining the said parts in abutting relation, the part defining the outer wall being a ring of hard highly abrasion-resistant material.

2. A spray nozzle as defined in claim 1 in which the said fluid inlet port means are spaced radially inward from said outer wall by a substantial distance such that the swirling body of liquid radially outward of the inlet port means is effective to shield the outer wall from direct impingement by the fluid entering the chamber through the said inlet port means.

3. A nozzle as defined in claim 1 in which the said ring is of a material more highly abrasion-resistant than the material of the means defining the front and rear end walls.

4. A spray nozzle as defined in claim 1 in which the said part defining the end wall opposite the inlet port means is a plate of hard highly abrasion-resistant material.

5. A spray nozzle particularly adapted for use with liquids bearing abrasive materials comprising, in combination, an assembly defining a swirl chamber in the form of a figure of revolution about an axis, the said assembly comprising a first annular plate defining a front end wall of the chamber, a ring defining the outer wall of the chamber, a second annular plate defining a rear end wall of the chamber and defining a fluid outlet coaxial with said chamber through the rear end wall thereof, one said plate further defining fluid inlet port means through the said end plate disposed generally tangentially to said axis so as to cause fluid supplied to said chamber through said port means to swirl around said axis against said outer wall and between said front and rear end walls and to flow through said outlet, the said plates and ring being physically distinct and readily separable and being held in abutting stacked relation with the ring disposed between the plates to define the chamber, and readily detachable means retaining the said plates and ring assembled in abutting relation, the said ring being composed of hard highly abrasion-resistant material.

6. A spray nozzle as defined in claim 5 in which the said fluid inlet port means are spaced radially inward from said outer wall by a substantial distance such that the swirling body of liquid radially outward of the inlet port means is effective to shield the outer wall from direct impingement by the fluid entering the chamber through the said inlet port means.

7. A nozzle as defined in claim 5 in which the said ring is of a material more highly abrasion-resistant than the material of the means defining the front and rear end walls.

8. A spray nozzle as defined in claim 5 in which the said annular plate defining the end wall opposite the inlet port means is composed of hard highly abrasion-resistant material.

References Cited

UNITED STATES PATENTS

| 1,919,027 | 7/1933 | Klotzman | 239—602 |
| 3,131,779 | 5/1964 | Rowley et al. | 239—602 |
| 3,132,670 | 5/1964 | David et al. | |
| 935,124 | 9/1909 | Myers | 239—497 X |
| 1,432,958 | 10/1922 | Boyce | 239—497 X |
| 1,497,462 | 6/1924 | Osburn | 239—497 X |
| 1,847,964 | 3/1932 | Hull | 239—497 X |
| 2,127,883 | 8/1938 | Norton | 239—497 |

FOREIGN PATENTS 851,714  10/1939  France.

EVERETT W. KIRBY, Primary Examiner

U.S. Cl. X.R.

239—404, 443, 405, 602, 497, 600, 596